L. ENYEART.
STRETCHER CARRIER.
APPLICATION FILED JUNE 18, 1915.

1,175,731.

Patented Mar. 14, 1916.
2 SHEETS—SHEET 1.

Inventor
Lawrence Enyeart

Witness
Geo. Ackman Jr.

By Victor J. Evans
Attorney

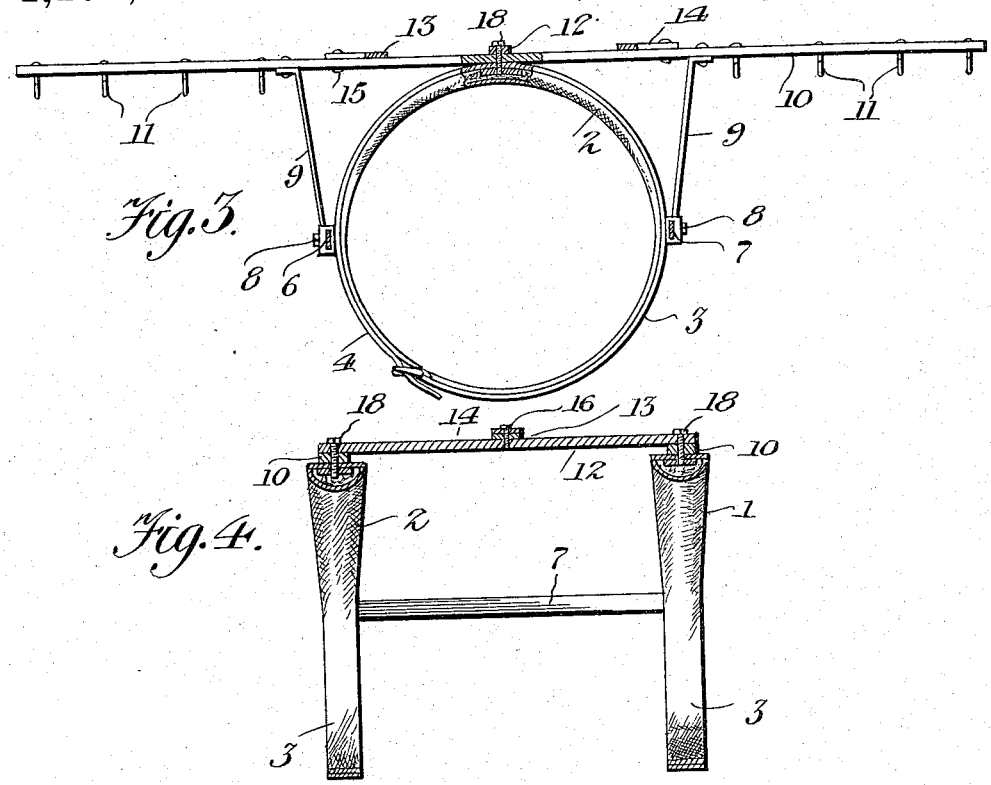
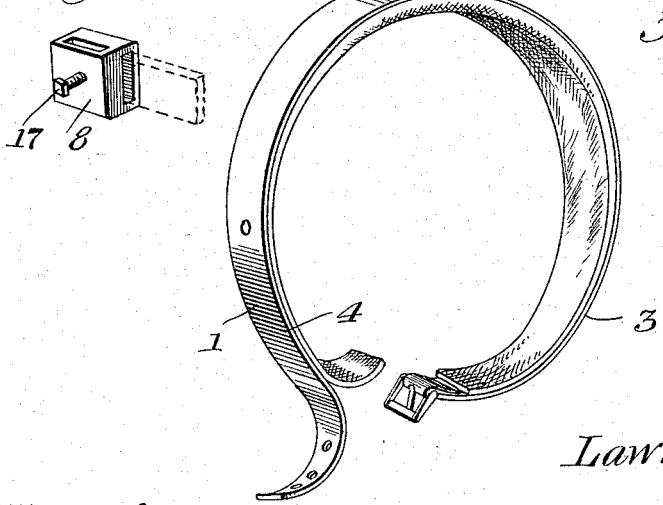

UNITED STATES PATENT OFFICE.

LAWRENCE ENYEART, OF PERU, INDIANA.

STRETCHER-CARRIER.

1,175,731.  Specification of Letters Patent.  Patented Mar. 14, 1916.

Application filed June 18, 1915. Serial No. 34,908.

*To all whom it may concern:*

Be it known that I, LAWRENCE ENYEART, a citizen of the United States, residing at Peru, in the county of Miami and State of Indiana, have invented new and useful Improvements in Stretcher-Carriers, of which the following is a specification.

The present invention relates to apparatus adapted to be fitted upon an animal to serve as a support for a stretcher or the like, and the primary object of the invention is to provide a device of this class which may be easily and quickly strapped and secured to an animal in such a manner as to prevent the tilting of the same, and wherein one or a plurality of stretchers may be supported from either side of the animal, and the arrangement of which being such as to not interfere with the travel of the animal or to inflict injury to the said animal.

With the above and other objects in view, the improvement resides in the construction, combination and arrangement of parts set forth in the following specification and falling within the scope of the appended claims.

Figure 1:
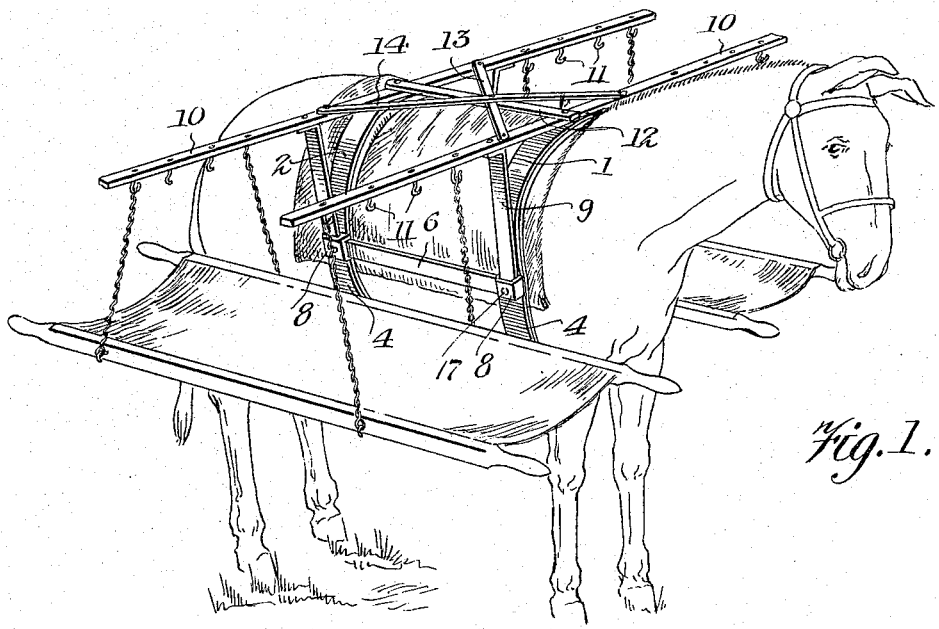
Figure 2:
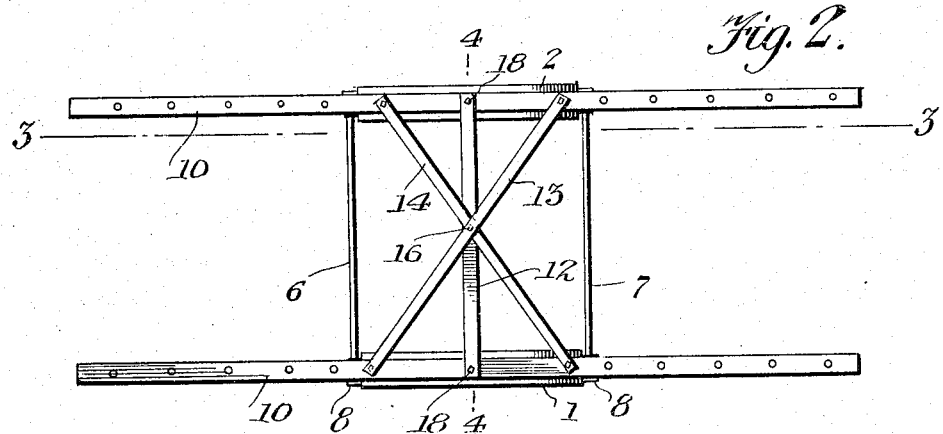

In the drawings: Figure 1 is a view illustrating the application of the device, Fig. 2 is a top plan view of the device detached. Fig. 3 is a transverse sectional view approximately on the line 3—3 of Fig. 2, Fig. 4 is a longitudinal sectional view approximately on the line 4—4 of Fig. 2, and Fig. 5 is a perspective view of one of the saddle members, and Fig. 6 is a similar view of one of the adjustable sleeves.

The apparatus is primarily intended for use in connection with the hospital corps of an army and is in the nature of an apparatus which is adapted to be attached to the body of an animal that is employed upon a battle field for conveying the wounded from the said field to the hospital tent.

In applying the apparatus a blanket is first placed over the back and sides of the mule or other animal so that the apparatus will not chafe or injure the animal when the weight of the wounded is arranged upon stretchers which are carried by the said apparatus.

The device includes a front saddle 1 and a rear saddle 2 which may be constructed of material best suited for the purpose for which they are devised, the saddle 1 being arranged over the withers of the animal while the rear saddle 2 is arranged upon the back of the animal forward of his hips. The ends of each of the saddles are provided with belly bands 3 and 4 respectively, each of said bands comprising two members, one having its end provided with a buckle and the second being bifurcated and adapted to be received by the buckle and to be engaged by the tongue of the said buckle. Of course, the saddle members have their underfaces padded and the belly bands are adapted to be properly adjusted to prevent the same moving either longitudinally of the animal or to revolve around the animal. The ends of the saddles 1 and 2 are provided with longitudinally extending brace members 6 and 7 respectively, and if desired, these brace members may be adjusted to compensate for the different sized animals upon which the apparatus is arranged. The brace members 6 and 7 are preferably provided with adjustable sleeves 8—8 which form bearings for vertically extending supports 9—9. The supports connect with laterally extending arms 10—10, the ends of said arms being extended a suitable distance beyond the sides of the saddles 1 and 2 and the underfaces of the arms are provided with a plurality of hooks 11—11.

The numeral 12 designates a central brace which extends longitudinally of the saddles 1 and 2 and is secured to the upper portion or faces thereof, and the numerals 13 and 14 designate angularly disposed brace members which have their ends each secured to one of the arms 10, as at 15, and the said brace members are centrally connected together and to the longitudinal brace member 12 as indicated by the numeral 16.

Screws 17 secure the vertical members 9 within the sleeve or pocket 8 and similar screws or bolts 18 connect the central portions of the arms 10 with the saddles 1 and 2, and it will be noted that any number of stretchers may be suspended from the hooks 11 carried by the members 10. It will be further noted that the arrangement of the device is such that it may be easily and quickly positioned upon an animal, that the same will be prevented from tilting or longitudinal movement and while the device is extremely simple in construction, it is thoroughly efficient for the purpose for which it is intended.

Having thus described the invention, what I claim is:

1. A stretcher carrier device for use in connection with animals comprising, a front and rear saddle, belly bands arranged upon the ends of the saddles, longitudinally extending brace members connecting the ends of the saddles, vertically arranged supports upon the brace members, transverse arms secured to the supports and to the saddles, brace members for the arms, and hooks depending from the transverse arms.

2. In a device for the purpose set forth, two spaced saddles, belly bands connected with the saddles, longitudinally extending brace members for the saddles, sleeves carried by the brace members, vertical members adjustably supported in the sleeves, lateral arms connected with the vertical members, a central brace member connecting the saddles and the lateral arms, diagonally disposed brace members connected with the arms and centrally with the uppermost of the longitudinally extending brace members, and a plurality of spaced hooks depending from the lateral arms adjacent the ends thereof.

In testimony whereof I affix my signature in presence of two witnesses.

LAWRENCE ENYEART.

Witnesses:
O. E. BRAMELLER,
J. H. WILD.

Copies of this patent may be obtained for five cents each, by addressing the "Commissioner of Patents, Washington, D. C."